United States Patent [19]

Beaumont

[11] Patent Number: 4,561,827
[45] Date of Patent: Dec. 31, 1985

[54] AIR COMPRESSOR HAVING CONDITION RESPONSIVE CLUTCH CONTROL

[75] Inventor: Paul Beaumont, Gwent, Wales

[73] Assignee: Lucas Industries Limited, Birmingham, England

[21] Appl. No.: 587,675

[22] Filed: Mar. 8, 1984

[30] Foreign Application Priority Data

Mar. 12, 1983 [GB] United Kingdom ............... 8306874
Dec. 3, 1983 [GB] United Kingdom ............... 8332322

[51] Int. Cl.⁴ .................. F04B 49/00; F04B 35/00; F16D 19/00
[52] U.S. Cl. ................... 417/223; 417/319; 192/85 CA; 192/91 A
[58] Field of Search ............. 417/15, 223, 319, 212, 417/316; 192/70.27, 85 C, 85 CA, 85 F, 91 A, 91 R, 101, 106 F

[56] References Cited

U.S. PATENT DOCUMENTS

| | | | |
|---|---|---|---|
| 657,669 | 9/1900 | Nef | 192/91 R X |
| 709,832 | 9/1902 | Stevens | 192/91 R X |
| 1,291,875 | 1/1919 | Herr | 192/91 A X |
| 1,707,746 | 4/1929 | White et al. | 417/223 |
| 2,070,636 | 2/1937 | Yates | 192/70.27 |
| 2,665,674 | 1/1954 | Metsger et al. | 192/91 A X |
| 3,155,040 | 11/1964 | Shurts et al. | 417/223 |
| 3,461,993 | 8/1969 | Brundage | 192/91 A |
| 3,893,556 | 7/1975 | Lech, Jr. et al. | 192/91 A |
| 4,118,151 | 10/1978 | Murakami et al. | 417/223 |
| 4,166,713 | 9/1979 | Debrey | 417/40 |
| 4,226,319 | 10/1980 | Euler et al. | 192/85 CA |

FOREIGN PATENT DOCUMENTS

| | | | |
|---|---|---|---|
| 51760 | 5/1982 | European Pat. Off. | 417/316 |
| 713278 | 8/1931 | France | 417/223 |
| 721478 | 12/1931 | France | 417/319 |

*Primary Examiner*—William L. Freeh
*Assistant Examiner*—Paul F. Neils
*Attorney, Agent, or Firm*—Holman & Stern

[57] ABSTRACT

An air compressor has a piston (3) reciprocable to compress air within a cylinder (2), a clutch (16) to transmit drive from a drive input shaft (12) to the piston when compression is required, a piston (27) arranged to be responsive to pressure resulting from the compressor output operable to disengage the clutch (16) and thereby interrupt drive to the compressor piston when the pressure reaches a predetermined value, and a passage (37) to provide a leakage path for the pressure applied to the piston (27) to enable the pressure to decay in a controlled manner when further operation of the piston is required, whereby engagement of the clutch is permitted to occur progressively and shock loadings on the compressor components are minimized.

17 Claims, 2 Drawing Figures

AIR COMPRESSOR HAVING CONDITION RESPONSIVE CLUTCH CONTROL

BACKGROUND OF THE INVENTION

1. Field of the Invention

This invention relates to an air compressor, primarily for use in a vehicle air-actuated braking system, of the type having at least one compressor element operable by drive means to effect compression of air within a space, the compressed air usually being fed, in use, to a reservoir and thence on demand to the braking system for actuation of the latter.

2. Description of the Prior Art

In FIG. 1 of our co-pending British Patent Application No. 8215732 there is described an air compressor in which a compressor element is operable by drive means to effect compression of air within a space, the arrangement including a clutch for transmitting drive from the drive means to the compressor element when compression is required, the clutch being normally held in engagement by a spring device and being disengagable by a device responsive to a pressure resulting from the compressor output to interrupt the drive to the compressor element when said pressure reaches a predetermined value.

With such an arrangement, it is desirable to re-engage the clutch gradually after disengagement thereof in order to minimize shock loading of the compressor components. In our aforesaid British Application, it is proposed to use an unloader valve to hold open an inlet valve of the compressor temporarily in order to prevent compression during at least the initial stage of clutch re-engagement. However, this can be unduly complicated in practice and, in some circumstances, not entirely satisfactory in operation.

BRIEF SUMMARY OF THE INVENTION

An object of the invention is to provide an air compressor of the aforesaid kind incorporating improved means for effecting gradual re-engagement of the clutch.

According to the invention, an air compressor comprises at least one compressor element operable by drive means to effect compression of air within a space, a clutch for transmitting drive from the drive means to the compressor element when compression is required, a pressure device responsive to a pressure resulting from the compressor output and operable to disengage the clutch when said pressure reaches a predetermined value, resulting in an interruption of drive to the compressor element, and means providing a leakage path permitting pressure to decay in controlled manner from said device whereby clutch re-engagement is permitted to occur progressively.

In one convenient arrangement, said pressure is applied to said device by way of a one-way valve, and leakage path then being preferably incorporated in said valve, conveniently in the form of a passage through a valve member thereof.

Conveniently, a sleeve surrounds and is spaced from the longitudinal axis of a drive input shaft from the drive means, the sleeve containing the clutch and being drivingly engaged with a part of the latter. In one convenient arrangement, the sleeve is carried by said shaft and rotates with the latter.

The pressure device may conveniently be an annular piston surrounding said longitudinal axis and disposed at one side of an axially outwardly directed wall of the sleeve and acting on the latter via thrust means, the spring device also surrounding said longitudinal axis and acting on the opposite side of said sleeve wall in opposition to the action of said piston.

Advantageously, the pressure device may surround the drive input shaft and, in such an arrangement, a spring device acting in opposition to the pressure device, is advantageously located between said sleeve wall and an opposed wall of a radial flange of sais drive input shaft. This enables both the sleeve and thrust bearing to rotate continuously with the input shaft which means that the bearing is not subjected to accelerations during operation of the clutch and, since only the inertia of the clutch driven plates has to be overcome, in addition to that of the compressor components, the clutch capacity can be relatively small.

The clutch is conveniently pre-loaded in the clutch engagement direction, preferably by an additional spring means which may conveniently act between said pressure device and a fixed part of the compressor.

Such pre-loading is applied to ensure that the clutch engagement force remains adequate even when the force applied by the spring device is lessened as a result of its extending to compensate for the effect of wear of the clutch linings.

Preferably, said pre-load is applied at the side of the piston opposite to that acting on the sleeve.

The drive input shaft may conveniently be provided with a hollow co-axial boss which surrounds an adjacent end portion of a driven shaft of the compressor and is supported for rotation on the latter by the intermediary of a bearing. This helps to minimize the occurrence of eccentricities between the various co-axially mounted components.

In another convenient arrangement, the drive input shaft from the drive means is mounted with respect to a fixed part of the compressor by way of a tapered bearing.

Preferably, the drive input shaft is rotatably supported relative to a driven compressor shaft by means of a further tapered bearing. This arrangement can be especially useful when the drive input shaft receives its drive from the drive means by way of a helical gear drive since it reacts the axial component of force applied to the shaft from such a gear arrangement.

Typically, the taper bearings are arranged to be tapered in opposite directions in relation to the respective longitudinal axes of the shafts.

BRIEF DESCRIPTION OF THE DRAWINGS

The invention will now be described, by way of example, with reference to the accompanying drawings wherein.

DETAILED DESCRIPTION

Figure 1:
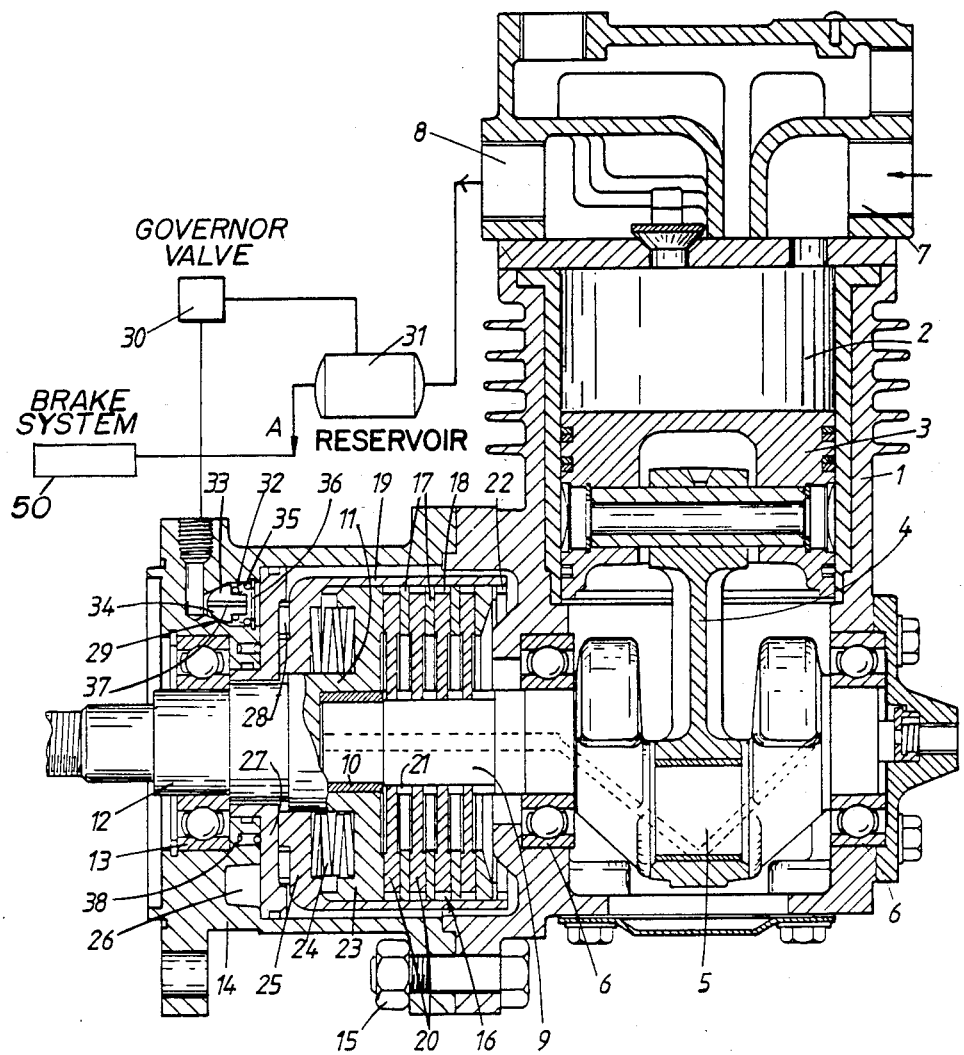
FIG. 1 is a longitudinal cross-sectional view of one embodiment of the air compressor of the invention.

Referring to FIG. 1 of the drawings, the compressor illustrated therein is primarily intended for use with a vehicle air-actuated braking system, of which a part is illustrated diagrammatically. The compressor comprises a housing 1 defining a cylinder 2 within which slides a piston 3, coupled by a connecting rod 4 to a crank shaft 5 supported in bearings 6 mounted in the housing. As indicated by the arrows, air enters the cylinder during the induction stroke of the piston via an inlet port 7 and leaves the cylinder via an exhaust port 8, the ports being controlled by reed valves, in conventional manner. The crank shaft 5 has an axial extension 9, an end portion of which carries a bearing bush 10 which is telescopically engaged within a hollow end portion 11 of a drive input shaft 12 rotatably supported in a bearing 13 mounted in a sub-housing 14 which is secured to the housing 1 by bolts 15 and surrounds the outer end portion of the crank shaft extension 9.

The crank shaft is driven from the drive input shaft 12 by a multi-plate clutch, indicated generally at 16, which may be dry or oil immersed, and which includes a plurality of driving clutch plates 17 mounted, by way of splines 18 as shown or by other suitable means, within a hollow clutch member 19 which surrounds the clutch and is rotatable with the shaft 12. The clutch plates 17 are thus fast for rotation with but axially slidable relative to the clutch member 19. The clutch further includes a plurality of driven plates 20 inter-leaved with the driving plates 17 and being fast for rotation with but axially slidable relative to the crank shaft extension 9, by way of splines 21. The clutch plates are retained within the clutch member 19 by means of a circlip 22.

The clutch plates are normally urged into driving engagement with a second clutch member 23 formed by a radial flange of the drive input shaft 12, by means of a conical disc spring washer assembly 24 acting between the side of the clutch member 23 remote from the clutch plates and the opposed surface of a radially extending flange 25 of the clutch member 19, this clutch member being slidable along the drive input shaft 12 to enable the force of the washer assembly to be applied to the clutch plates through the circlip 22. The clutch member 23 is drivingly engaged with the splines 18 of the clutch member 19.

The sub-housing 14 forms an annular chamber 26 containing an annular piston 27 slidable therein, the piston acting via a thrust bearing 28 on the outer surface of the flange 25 of the clutch member 19. A control valve 29 is provided within the housing 1 and the chamber 26 is connected by way of this valve and a suitable governor valve 30, such as the type shown in British Pat. No. 935,567, for example, to a reservoir 31 connected to the outlet port 8 of the compressor. The reservoir would normally be connected via a line A to one or more brake actuators (not shown) of a conventional brake system 50 of a vehicle braking system, in conventional manner.

The control valve 29 contains a valve chamber 32 within which is disposed a valve element 33 urged against a conical valve seat 34 in the housing by a spring 35 acting acting between the valve member and an abutment, shown as a circlip 36. The valve element has an axial through bore 37 of very narrow diameter in order to provide a leakage path through the valve, for the purpose to be described.

A plurality of springs 38 are mounted in the end wall of the housing 1 and act between that end wall and the opposed wall of the piston 27 so as to apply a permanent pre-load across the clutch 16 via the thrust bearing 28 and belville stack 24 so that, as wear of the clutch facings takes place, tending to produce extension of the belville stack 24, the piston 27 and clutch member 19 are urged to the right by the springs 38, maintaining the stack 24 in substantially its original state and adequate clutch engaging force thereby continues to be provided.

It would be possible to use only a single pre-loading spring, which may conveniently be a coil spring surrounding the shaft 12 and inserted within an annular groove of the piston.

The input shaft 12 is continuously rotated by a power source, such as the engine of a vehicle in which the system is installed. The chamber 26 is initially unpressurized and the conical washer assembly 24 clamps the clutch plates into firm engagement, enabling drive to be transmitted from the input shaft 12 via the clutch member 19 to the crank shaft extension, causing reciprocation of the piston 3 and charging of the reservoir 31. When the pressure within the reservoir reaches a predetermined value, the governor valve 30, which is responsive to the reservoir pressure, operates to apply the reservoir pressure via the control valve 29 to the chamber 26. The area of the piston 27 is chosen, in relation to the applied pressure and force of the washer assembly 24, so that the reservoir pressure applied to the piston produces sufficient force to overcome the washer assembly 24 and thereby pushes the clutch member 19 to the right, as viewed in the drawings, against the action of the washer assembly 24 to disengage the clutch. This interrupts the drive between the input shaft 12 and the compressor piston and prevents further charging of the reservoir until this is required according to the conditions of use.

As usage of the braking system takes place, the pressure in the reservoir will be progressively reduced and will ultimately reach a predetermined pressure at which the governor valve is set to operate to disconnect the reservoir from the chamber 26. The pressure in this chamber will now gradually decay through the passage 37 in the one-way valve 29 so that the clutch disengagement force exerted by the piston 27 is gradually reduced, enabling the conical washer assembly 24 to re-exert a clutch engagement force in a progressive and controlled manner, thereby avoiding excess shock loadings being applied to the compressor components, as would occur if the clutch were permitted to be abruptly engaged. During normal operation of a vehicle in which the system is installed, the cycle will be repeated to maintain the pressure in the reservoir 31 within a range between desired maximum and minimum pressures.

In this embodiment, it will be seen that, because the clutch member 19 and drive input shaft 12 are arranged to rotate as a unit, the only components of the drive train (excluding the crank shaft) which are required to be accelerated upon clutch engagement are the driven clutch plates 20, which means that the inertia of the driven components is minimized, enabling a lower capacity clutch to be used than that required, for example, in the arrangement described in our British patent application No. 8306874.

The arrangement shown in FIG. 2 of the drawings is generally similar, both in structure and operation to the arrangement described above and only the significant differences will be described in detail.

The principal differences lie in the arrangement of the clutch components relative to the drive input shaft 12 and crankshaft extension 9. The clutch member 23 no longer forms part of the input shaft 12, but is mounted on the crankshaft extension 9 inboard of the clutch 16, being keyed at 9A to the extension and rotationally supported relative to the input shaft 12 by way of a tapered roller bearing 40. The clutch member 19 is mounted on an axially extending boss 23A of the clutch member 23 and surrounds the member 23 with its open end facing the drive shaft 12. The clutch member 23 is in splined engagement, as previously, with the interior of the member 19. In this embodiment, the clutch 16 is disposed at the side of the member 23 remote from the crankshaft and the piston 27 at the opposite side thereof, the washer assembly 24 being preloaded, as before, by one or more springs 38.

In this embodiment, the drive input shaft 12 is mounted relative to the sub-housing 14 by way of a further tapered roller bearing 41 retained in position by a circlip 43, and the driving clutch plates 17 are mounted directly on the shaft 12 by way of splines 18, the driven clutch plates 20 engaging the clutch member 19 by way of the splines 21 with which the clutch member 23 is engaged. A shim 44 may be provided between the bearing 41 and circlip 43 to take up end float in the bearing/shaft assembly.

The direction of tapered of the taper roller bearings 40, 41 is in opposite directions relative to the longitudinal axis of the shaft 12. The bearing 41 reacts axial load occurring in the clutch during disengagement thereof and the bearing 40 reacts axial load generated when drive is applied to the drive input shaft 12 by means of a helical gear drive, the helix angle of which would be typically 20°.

It will be understood that various constructional details of the embodiments herein described may be modified, without departing from the scope of the present invention. For example, as described in our co-pending British patent application No. 8215732, it would be possible to drive the piston via an eccentric in place of the crank shaft 5, thereby enabling a constantly rotating shaft to be provided for driving auxilliary equipment, as described in our aforesaid application. Various mechanical details, such as the type of clutch may be varied as desired and, although the clutch is illustrated herein as being contained within a separate housing 14, the latter may be formed integrally with the main housing 1 of the compressor. Although FIG. 2 shows the control valve 29 as a separate item, it may be incorporated in the housing 1, as in the arrangement of FIG. 1.

Figure 2:
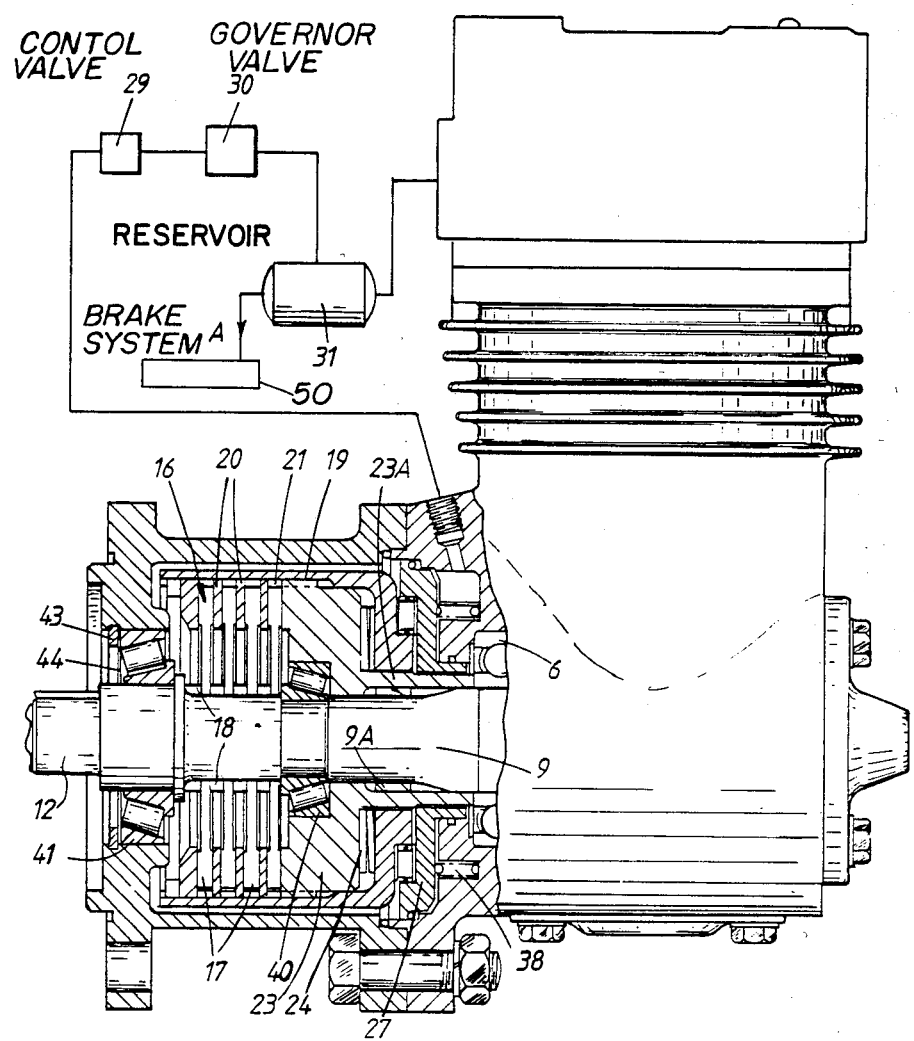
FIG. 2 is view similar to FIG. 1 of an alternative form of the air compressor of the invention.

In the FIG. 2 embodiment, the control valve 29 is shown as a separate item arranged externally of the housing 14. The valve 29 would conveniently be identical with that described in relation to FIG. 1 and incorporate a leakage path in the form of passage 37 for the piston pressure. It would, however, be possible for details of the valve to be varied from the form illustrated. It would also be possible in any embodiment of the invention, to incorporate the leakage path as an item separate from the valve 29, either within the compressor housing or in a separate component.

I claim:

1. An air compressor comprising:
    a compressor housing having at least one compression chamber and at least one inlet and at least one outlet for said chamber;
    inlet and outlet valve means operatively associated with said at least one inlet and outlet to control airflow into and out of said chamber;
    piston means operatively disposed in said chamber and cooperatively associated with said valve means to compress air in said chamber;
    drive means having a drive shaft rotatably mounted in said housing;
    clutch means operatively disposed between said drive shaft and said piston means to transmit drive from said drive shaft to operate said piston means;
    said clutch means comprising,
        a sleeve member in surrounding spaced relationship with respect to the longitudinal axis of said drive shaft, clutch elements contained within said sleeve element, part of said clutch elements being drivingly engaged with said sleeve element to be driven thereby,
        a flange on said sleeve member extending radially with respect to the longitudinal axis of said drive shaft,
    clutch element engaging means mounted between said clutch elements and said flange, and
    a clutch spring device surrounding the longitudinal axis of said drive shaft and acting on one side of said flange and said clutch element engaging means to resiliently urge said clutch elements into engagement so that said drive shaft drives said piston;
    an annular axially movable piston surrounding the longitudinal axis of said drive shaft disposed on the other side of said flange;
    a thrust means interposed between one side of said annular piston and said other side of said flange to transmit axial force from said annular piston to said flange;
    means to apply outlet pressure from the compressor to said annular piston to operate said annular piston to disengage said clutch elements when said outlet pressure reaches a predetermined value to interrupt the transmission of drive from said drive shaft to said piston means;
    leakage path means operatively associated with said means to apply outlet pressure to allow said pressure applied to said annular piston to decay in a controlled manner after said predetermined pressure has been reached so that re-engagement of said clutch elements occurs progressively; and
    means to pre-load said annular piston on the other side thereof in the direction against the force of said clutch spring device to compensate for wear of said clutch elements and maintain adequate clutch engaging force of said clutch spring device.

2. An air compressor as claimed in claim 1 wherein:
    said clutch element engaging means comprises a radial flange integral with said drive shaft;
    said annular piston surrounds said drive shaft; and
    said spring device is operatively mounted between said drive shaft flange and said sleeve flange.

3. An air compressor as claimed in claim 1 wherein:
    said pre-loading means comprises a spring means.

4. An air compressor as claimed in claim 1 and further comprising:
    an inner end on said drive shaft within said housing;
    a hollow co-axial boss on said inner end of said drive shaft; and
    a compressor shaft rotatably mounted in the housing and operatively connected to said piston to drive said piston and having an end portion adjacent the inner end of said drive shaft disposed within said hollow boss and rotatably supporting said hollow boss thereon.

5. An air compressor as claimed in claim 1 wherein:
    said sleeve member is mounted on said drive shaft to be rotated therewith.

6. An air compressor as claimed in claim 5 wherein:
    said clutch element engaging means comprises a radial flange integral with said drive shaft;
    said annuular piston surrounds said drive shaft; and said spring device is operatively mounted between said drive shaft flange and said sleeve flange.

7. An air compressor as claimed in claim 1 and further comprising:
a tapered roller bearing mounted in said housing and rotatably supporting said drive shaft.

8. An air compressor as claimed in claim 7 and further comprising:
a compressor shaft rotatably mounted in said housing and operatively connected to said piston to drive said piston; and
a further tapered roller bearing axially spaced from said first mentioned tapered roller bearing rotatably supporting said drive shaft with respect to said compressor shaft.

9. An air compressor as claimed in claim 8 wherein the angles of taper of said tapered roller bearings relative to the longitudinal axes of said shafts are opposite with respect to each other.

10. An air compressor as claimed in claim 1 and further comprising:
a one-way control valve operatively connected to said outlet pressure applying means to control pressure therefrom to said annular piston.

11. An air compressor as claimed in claim 10 wherein the one-way valve is incorporated in the compressor housing.

12. An air compressor as claimed in claim 10 wherein the leakage path means is incorporated in the one-way valve.

13. An air compressor as claimed in claim 12 wherein:
said one-way control valve comprises a valve member; and
said leakage path means comprises a fluid passage through said valve member.

14. An air compressor as claimed in claim 13 wherein:
said clutch element engaging means comprises a radial flange integral with said drive shaft;
said annular piston surrounds said drive shaft; and
said spring device is operatively mounted between said drive shaft flange and said sleeve flange.

15. A vehicle air-actuated braking system comprising an air compressor according to claim 1, and a reservoir operatively connected to the compressor outlet and to a vehicle brake system to operate one or more brakes, and control valve means operatively connected to the compressor outlet and to the annular piston to cause clutch disengagement when said pressure reaches said predetermined value.

16. A braking system according to claim 15 wherein said leakage path is provided externally of the compressor housing.

17. A braking system according to claim 15 wherein said leakage path is provided internally of the compressor housing.

* * * * *